US008527199B1

(12) United States Patent
Burnette et al.

(10) Patent No.: US 8,527,199 B1
(45) Date of Patent: Sep. 3, 2013

(54) AUTOMATIC COLLECTION OF QUALITY CONTROL STATISTICS FOR MAPS USED IN AUTONOMOUS DRIVING

(75) Inventors: Donald Jason Burnette, Palo Alto, CA (US); Andrew Hughes Chatham, San Francisco, CA (US); Matthew Paul McNaughton, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/474,591

(22) Filed: May 17, 2012

(51) Int. Cl.
*G01C 21/00* (2006.01)

(52) U.S. Cl.
USPC ............................. 701/450; 701/23; 701/425

(58) Field of Classification Search
USPC ............. 701/26, 23, 28, 409, 532, 301, 423; 382/104; 700/250
See application file for complete search history.

(56) References Cited

U.S. PATENT DOCUMENTS

| | | | | |
|---|---|---|---|---|
| 5,793,934 | A * | 8/1998 | Bauer | 700/250 |
| 6,453,056 | B2 * | 9/2002 | Laumeyer et al. | 382/104 |
| 7,136,748 | B2 * | 11/2006 | Umezu et al. | 701/532 |
| 7,912,633 | B1 | 3/2011 | Dietsch et al. | |
| 8,126,642 | B2 * | 2/2012 | Trepagnier et al. | 701/423 |
| 8,200,423 | B2 * | 6/2012 | Dietsch et al. | 701/409 |
| 8,260,482 | B1 * | 9/2012 | Szybalski et al. | 701/23 |
| 8,280,623 | B2 * | 10/2012 | Trepagnier et al. | 701/301 |
| 8,306,735 | B2 * | 11/2012 | Mudalige et al. | 701/409 |
| 8,346,426 | B1 * | 1/2013 | Szybalski et al. | 701/28 |
| 8,352,110 | B1 * | 1/2013 | Szybalski et al. | 701/23 |
| 2008/0162036 | A1 | 7/2008 | Breed | |
| 2010/0097455 | A1 | 4/2010 | Zhang et al. | |
| 2010/0280699 | A1 | 11/2010 | Bageshwar et al. | |
| 2012/0316725 | A1 * | 12/2012 | Trepagnier et al. | 701/26 |

* cited by examiner

*Primary Examiner* — Thomas Black
*Assistant Examiner* — Robert Payne
(74) *Attorney, Agent, or Firm* — McDonnell Boehnen Hulbert & Berghoff LLP

(57) ABSTRACT

Disclosed herein are methods and apparatus for generating accurate maps for autonomous vehicles. A map is stored at a computing device associated with a vehicle. The vehicle can be operated in a partially-autonomous mode, where the computing device can generate driving directions for manual execution along a route based on the map. The computing device can be configured to receive and store information related to features and a quality of driving along the route. The map can be updated and quality control statistics can be determined based on the stored information. The updated map can be promoted based on the quality control statistics. In response to promoting the updated map, the computing device can store the promoted map and enable the vehicle to operate in the autonomous-operation mode using the promoted map.

21 Claims, 6 Drawing Sheets

AUTOMATIC COLLECTION OF QUALITY CONTROL STATISTICS FOR MAPS USED IN AUTONOMOUS DRIVING

BACKGROUND

Autonomous vehicles use various computing systems to aid in transporting passengers from one location to another. Some autonomous vehicles may require some initial input or continuous input from an operator, such as a pilot, driver, or passenger. Additional inputs, such as maps and other routing information, may be provided to the autonomous vehicle. Other systems, such as autopilots and automatic parking systems, may be used only when the system has been engaged. These systems permits the operator to switch between a manual mode (where the operator exercises a high degree of control over the movement of the vehicle), an autonomous mode (where the vehicle essentially drives itself), and modes that lie somewhere in between.

SUMMARY

In one aspect, a method is provided. A map is stored at a computing device associated with a vehicle. The vehicle is configured to operate in a non-autonomous mode, a partially-autonomous mode, and an autonomous-operation mode. The map includes information about a plurality of roads and a plurality of features. The vehicle is operated in the partially-autonomous mode. Operating the vehicle in the partially-autonomous mode includes: (i) generating driving directions for manual execution along a route based on the map, (ii) receiving information related to features of the route and to a quality of driving along the route, the plurality of features including at least some of the features of the route, and (iii) storing the information related to the features of the route and to the quality of driving along the route. The map is updated based on the stored information related to the features of the route and to the quality of driving along the route. A determination is made whether to publish the updated map based on the one or more quality control statistics. In response to determining to publish the updated map: the published map is stored in the computing device and the vehicle is enabled to operate in the autonomous-operation mode using the published map.

In another aspect, an article of manufacture is provided. The article of manufacture includes a non-transitory computer-readable storage medium having instructions stored thereon that, when executed by a processor, cause the processor to perform functions. The functions include: (a) storing a map at a computing device associated with a vehicle, where the vehicle is configured to operate in a non-autonomous mode, a partially-autonomous mode, and an autonomous-operation mode, and where the map includes information about a plurality of roads and a plurality of features, (b) operating the vehicle in the partially-autonomous mode, where operating the vehicle in the partially-autonomous mode includes: (i) generating driving directions for manual execution along a route based on the map, (ii) receiving information related to features of the route and to a quality of driving along the route, the plurality of features including at least some of the features of the route, and (iii) storing the information related to the features of the route and to the quality of driving along the route, (c) updating the map based on the stored information related to the features of the route and to the quality of driving along the route, (d) determining one or more quality control statistics based on the stored information related to the features of the route and to the quality of driving along the route, (e) determining whether to publish the updated map based on the one or more quality control statistics, and (f) in response to determining to publish the updated map: (i) storing the published map in the computing device and (ii) enabling operation of the vehicle in the autonomous-operation mode using the published map.

In still another aspect, a computing device is provided. The computing device includes a processor and a non-transitory computer readable medium having stored thereon instructions that, when executed by the processor, cause the computing device to perform functions. The functions include: (a) selecting a map for a vehicle, where the vehicle is configured to operate in a non-autonomous mode, a partially-autonomous mode, and an autonomous-operation mode, and where the map includes information about a plurality of roads and a plurality of features, (b) operating the vehicle in the partially-autonomous mode, where operating the vehicle in the partially-autonomous mode includes: (i) generating driving directions for manual execution along a route based on the map, (ii) receiving information related to features of the route and to a quality of driving along the route, the plurality of features including at least some of the features of the route, and (iii) storing the information related to the features of the route and to the quality of driving along the route, (c) updating the map based on the stored information related to the features of the route and to the quality of driving along the route, (d) determining one or more quality control statistics based on the stored information related to the features of the route and to the quality of driving along the route, (e) determining whether to publish the updated map based on the one or more quality control statistics, and (f) in response to determining to publish the updated map: (i) storing the published map in the computing device and (ii) enabling operation of the vehicle in the autonomous-operation mode using the published map.

DETAILED DESCRIPTION

Figure 1:
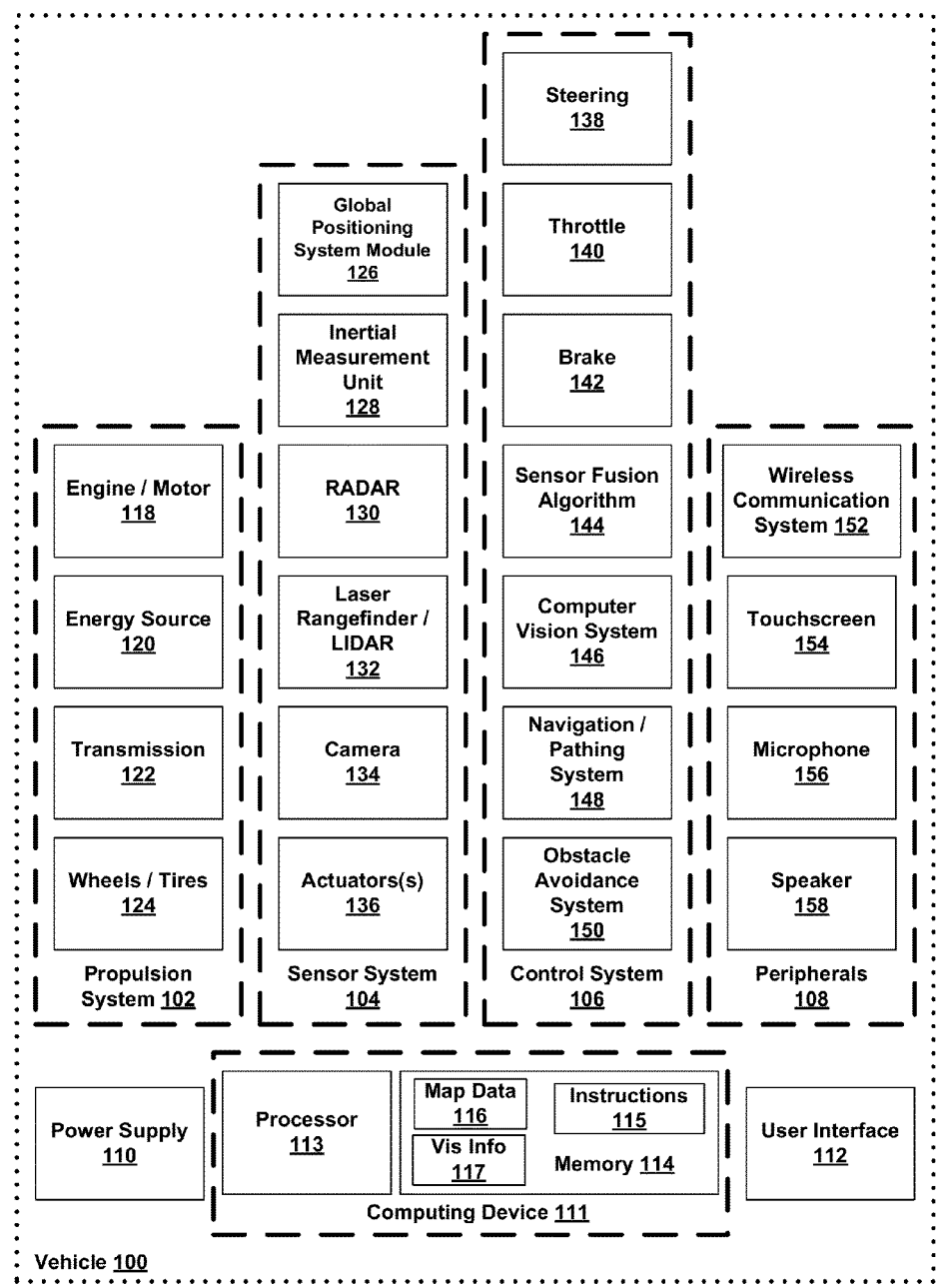
FIG. 1 is a simplified block diagram of an example vehicle, in accordance with an example embodiment.

A computing device can be programmed to function as a vehicle control system that operates a vehicle autonomously or without a human driver being required to direct the vehicle along a route from a start to a destination. To control the vehicle, the vehicle control system can generate and select driving behaviors on the way to the destination. Example driving behaviors include one or a combination of: maintaining a course and/or a speed, turning left/right, bearing left/right, reversing direction, performing a U-turn, increasing speed, decreasing speed, slowly moving forward, and stopping. Other driving behaviors are possible as well.

The vehicle control system may be implemented in or may take the form of a vehicle, such as an automobile. Alternatively, the vehicle control system may be implemented in or take the form of another vehicle, such as a truck, motorcycle, off-road vehicle, bus, boat, airplane, helicopter, lawn mower, recreational vehicle, amusement park vehicle, farm vehicle, construction vehicle, tram, golf cart, train, or trolley. Other vehicles can possibly be controlled by vehicle control systems as well.

The autonomous vehicle can operate in an operational mode, such as a non-autonomous mode, a partially-autonomous mode, or an autonomous-operation mode. The non-autonomous mode can use human input to select and execute driving behaviors during operation of the vehicle.

The partially-autonomous mode involves both vehicle control system and human inputs to select driving behaviors during operation of the vehicle. For example, the vehicle control system can generate indications of driving behaviors for review by a human driver. For each indication, the human driver can review the indication and operate the vehicle by carrying out, modifying, or ignoring the indication. Additional techniques for operating a vehicle in a partially-autonomous mode, such as auto-piloting and automatic parking, are possible as well.

In the autonomous-operation mode, the vehicle control system can select and execute driving behaviors along at least part of the route without human input. The autonomous-operation mode can be sub-divided into an autonomous mode utilizing a trained safety driver, an autonomous mode with a non-trained human driver, and an autonomous mode without a human driver. In autonomous-mode operation with a human driver, the vehicle control system can be configured to receive feedback from the human passenger about driving quality of the autonomous vehicle, and, in some circumstances, for the human driver to operate the vehicle.

The trained safety driver is specifically trained to observe autonomous-mode operation of the vehicle, observe vehicle operation, generate feedback on vehicle operation and/or maps used by the vehicle control system, and provide that feedback for quality control of the autonomous vehicle. An untrained driver can be a person trained to drive the vehicle, but not necessarily trained to generate and/or provide feedback for quality control of the autonomous vehicle.

To autonomously operate the vehicle, the computing device acting as the vehicle control system can estimate the current environment surrounding the vehicle based on a number of inputs. Sensors on the vehicle can provide inputs to the computing device that is generating and selecting driving behaviors. The sensors can provide information about features in the current environment, such as other vehicles, traffic signals and signs, directional information, locations, speeds, and acceleration, fuel information, vehicle status information, roads, intersections, lane information, lane boundaries, speed limits, and other features.

One or more maps can be input to the computing device acting as the vehicle control system. The map(s) can include location information for features such as traffic signs, signals, buildings, parking lots, parks/natural areas, road geometry information, lane information, additional information about buildings and other locations along a road, and other information.

In particular, highly accurate maps can be used for autonomous vehicle operation. To ensure accuracy of a map, the map can be generated, checked and/or revised as part of one or more quality control processes, and then "promoted" or certified for use in operating a vehicle in the autonomous-vehicle mode. Each quality control process can utilize data from one or more vehicles performing test drives using the map in a non-autonomous mode or a partially-autonomous mode.

For example, a quality control (QC) method for automatically collecting, quantifying, and certifying the correctness of the maps used for autonomous driving can involve the following operations:

A "candidate map" can be created. The candidate map can include "imagery" and "lane level maps". Imagery for the candidate map can include one or more images or views of an environment described by the map. Lane level maps can include indications of features of import in the environment usable while driving a vehicle.

The candidate map can be loaded into a vehicle control system for "simulated cruising". During a simulated cruise, the vehicle operates in a partially-autonomous mode with a human driver, perhaps a safety driver. The vehicle control system is configured to generate driving instructions along a route of the candidate map. If a generated driving instruction is correct and safe, the human driver can carry out the generated driving instruction. However, if the generated driving instruction is faulty, the human driver can make an annotation for one or more faults and makes adjustments to the instruction for safe driving and to reach a destination of the route. During each simulated cruise, the vehicle control system can log information about the route and vehicle operation, such as time, position, speed, and acceleration information, that can be used to update the candidate map.

After simulating cruising, the updated candidate map can be tested via one or more test drives, where the vehicle is in autonomous-operation mode and is accompanied by human safety drivers. The safety drivers can provide feedback on the test drives. QC statistics can be updated and/or generated for the test drive, perhaps based on the safety-driver feedback, to indicate that the vehicle is operating properly or not operating properly while autonomous-operation mode. Once the updated candidate map has gathered at least a threshold number of successful QC statistics, the candidate map can be designated to be a "promoted" or "published" map. Promoted/published maps can then be used in autonomous vehicle operation with either an untrained human driver or without human drivers. However, un-promoted/un-published candidate maps can only be used in vehicles in the autonomous-operation mode accompanied by safety drivers.

If a promoted or published map is later modified, part or the entire map can be retested to generate successful QC statistics for the modified portion(s) of the promoted or published map.

By the herein-described utilizing quality control processes for verifying candidate maps prior to promotion, and retesting changed portion(s) of promoted or published maps, autonomous vehicles can be provided with accurate maps during operation. Then, vehicle control systems operating with these accurate maps can provide safe, smooth, and accurate functioning of autonomous vehicles, particularly while the autonomous vehicle operates in the autonomous-operation mode.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

Map data 116 can include information for one or more roads and features along the roads. The road information can include locations that the road travels through, connecting roads, intersections, road names and/or numbers, road geometry information, road size (e.g., one lane, two lanes, etc.), lane information, and other information. Features along the road can include but are not limited to any combination of traffic signs, traffic signals, other signs and signals, buildings, parking lots, parks/natural areas, historical markers, amenities, points-of-interest, businesses, and additional information about locations along the road.

Map data 116 can include and/or be associated with visibility information 117 for features at various places along a road. Visibility information 117 can be generated, stored, and retrieved to aid navigation for the autonomous vehicle. Visibility information 117 can be stored with map data 116, with data that is otherwise associated with the map, such as a database that can be queried with map coordinates for an intersection and return the corresponding visibility information for the intersection. Once visibility information is calculated e.g., at a visibility calculation server, the visibility information can be stored and distributed to multiple autonomous vehicles. In some embodiments, the autonomous vehicle can query the visibility server for visibility information and/or maps during autonomous vehicle operation.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124. The propulsion system 102 may additionally or alternatively include components other than those shown.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a RADAR unit 130, a laser rangefinder and/or LIDAR unit 132, a camera 134, and actuators 136 configured to modify a position and/or orientation of the sensors. The sensor system 104 may include additional sensors as well, including, for example, sensors that monitor internal systems of the vehicle 100 (e.g., an oxygen monitor, a fuel gauge, an engine oil temperature, etc.). The sensor system 104 may additionally or alternatively include components other than those shown. Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be travelling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR 130 unit may be any sensor configured to sense objects in the environment in which the vehicle 100 is located using radio signals. In some examples, in addition to sensing the objects, the RADAR unit 130 may additionally be configured to sense the speed and/or direction of motion of the objects.

Similarly, the laser rangefinder or LIDAR unit 132 may be any sensor configured to sense objects in the environment in which the vehicle 100 is located using lasers. In particular, the laser rangefinder or LIDAR unit 132 may include a laser source and/or laser scanner configured to emit a laser and a detector configured to detect reflections of the laser. The laser rangefinder or LIDAR 132 may be configured to operate in a coherent (e.g., using heterodyne detection) or an incoherent detection mode.

The camera 134 may be any camera (e.g., a still camera, a video camera, etc.) configured to capture images of the environment in which the vehicle 100 is located. To this end, the camera may take any of the forms described above.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100. The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 may further be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well.

The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate the speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may include one or more general-purpose processors and/or one or more special-purpose processors. To the extent the processor 113 includes more than one processor; such processors could work separately or in combination. The computing device 111 may be configured to control functions of the vehicle 100 based on input received through the user interface 112, for example.

The memory 114, in turn, may include one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems are shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
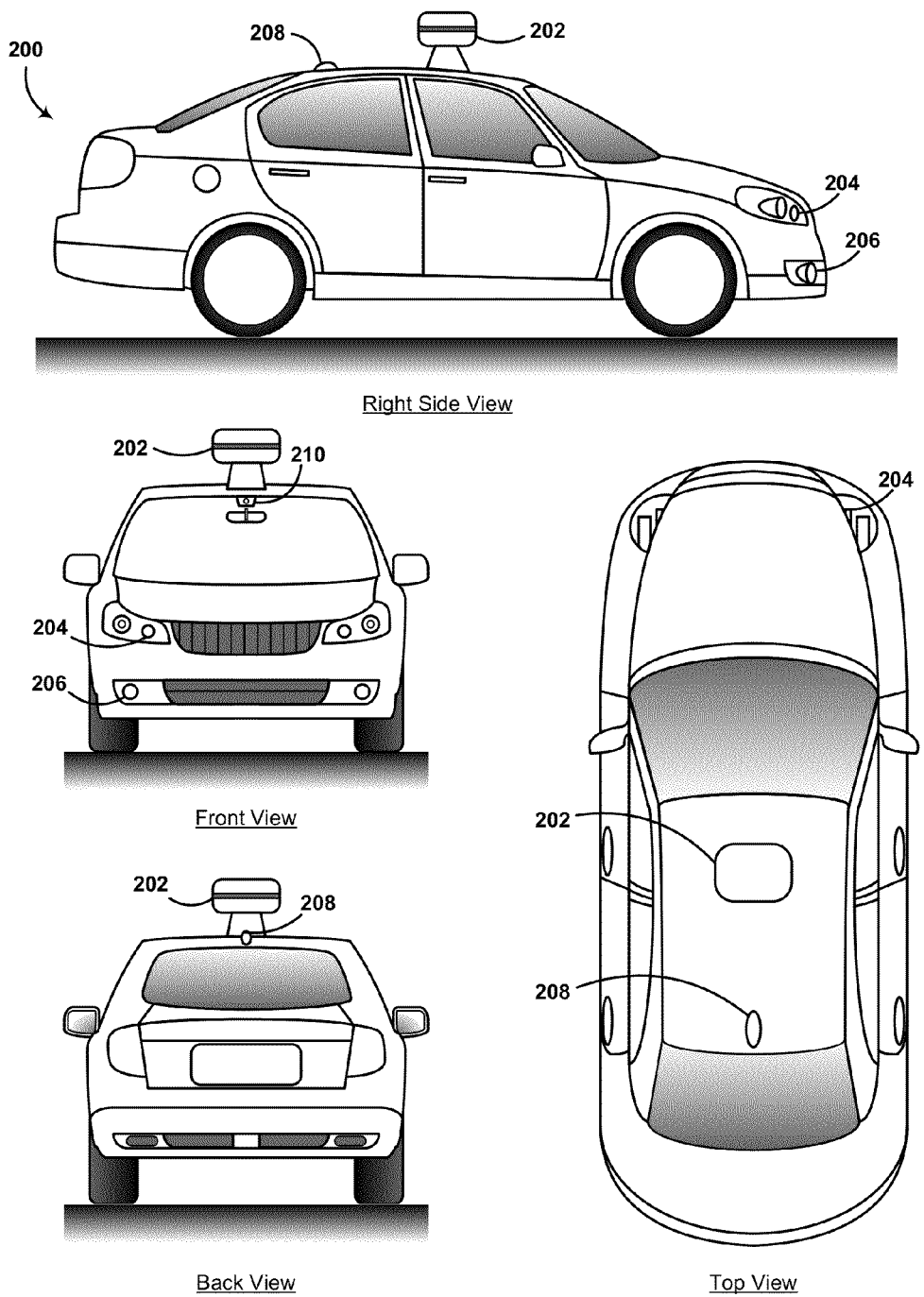
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as an automobile, other examples are possible. For instance, the vehicle 200 could represent a truck, motorcycle, off-road vehicle, bus, boat, airplane, helicopter, lawn mower, recreational vehicle, amusement park vehicle, farm vehicle, construction vehicle, tram, golf cart, train, trolley, or some other vehicle. As shown, the vehicle 200 includes a first sensor unit 202, a second sensor unit 204, a third sensor unit 206, a wireless communication system 208, and a camera 210. In some embodiments, vehicle 200 can include one or more other components in addition to or instead of those shown.

Each of the first, second, and third sensor units 202-206 may include any combination of global positioning system sensors, inertial measurement units, RADAR units, laser rangefinders, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may be configured to detect visible light, or may be configured to detect light from other, non-visible portions of the spectrum, such as infrared or ultraviolet light. Other types of cameras are possible as well. The camera 210 may be a two-dimensional detector, or may have a three-dimensional spatial range. In some examples, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern off the object. Based on distortions in the reflected light pattern, the vehicle 200 may determine the distance to the points on the object. The predetermined light pattern may include infrared light, or light of another wavelength.

As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object.

As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse, for example. Other range detecting techniques are possible as well, including stereo triangulation, sheet-of-light triangulation, interferometry, and coded aperture techniques, among others. The camera 210 may take other forms as well.

In some examples, the camera 210 may include a movable mount and/or an actuator configured to adjust the position and/or orientation of the camera 210. While FIG. 2 shows camera 210 mounted inside a front windshield of the vehicle 200, in other examples the camera 210 may be mounted elsewhere on the vehicle 200, either inside or outside the vehicle 200.

A control system of the vehicle 200 may be configured to control the vehicle 200 in accordance with a given driving behavior from among multiple possible driving behaviors. The control system may be configured to receive information from sensors coupled to the vehicle 200 (on or off the vehicle 200), select a driving behavior based on the information, and control the vehicle 200 in accordance with the selected driving behavior. The control system further may be configured to continuously monitor the information received from the sensors to continuously evaluate driving conditions and also may be configured to modify the driving behavior or select another driving behavior based on changes in the driving conditions.

Figure 3:
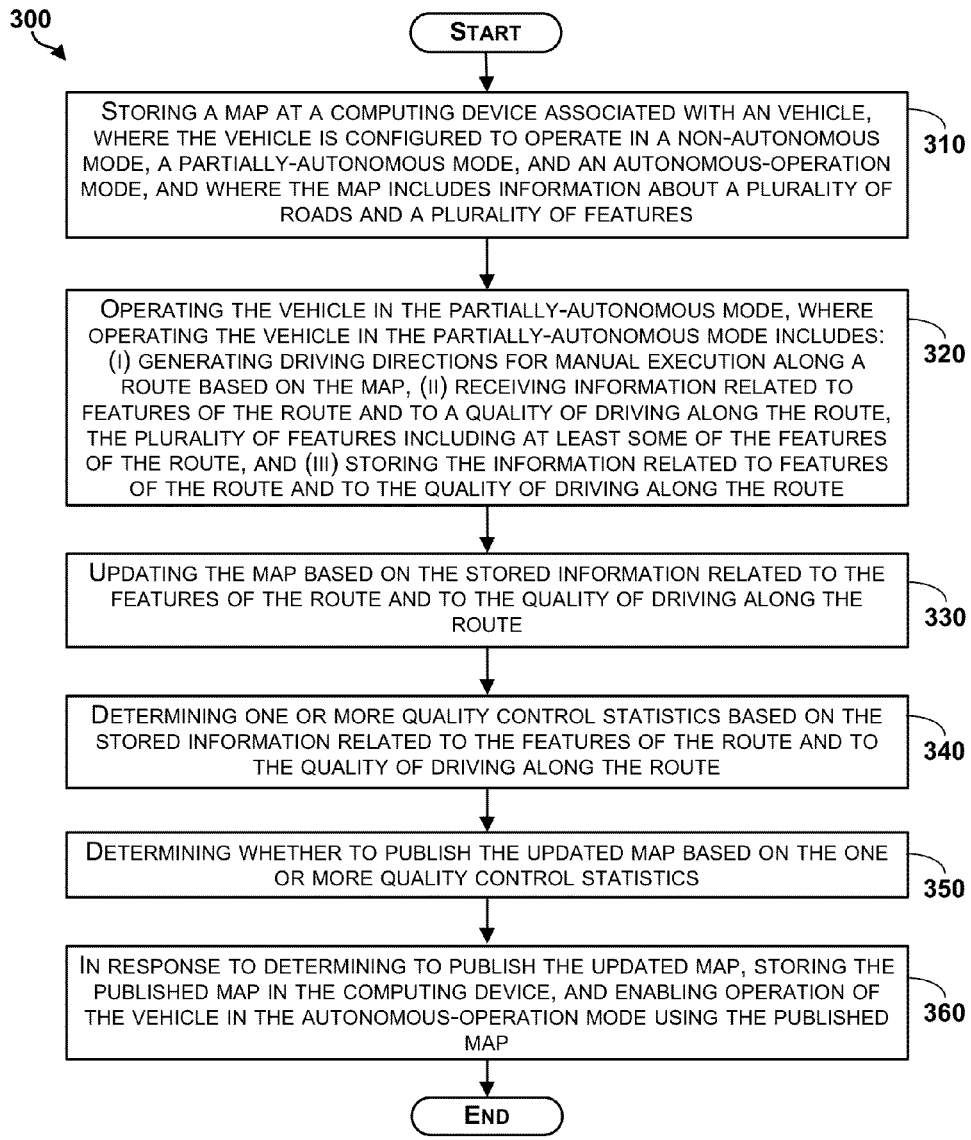
FIG. 3 is a flow chart illustrating a method, in accordance with an example embodiment.

FIG. 3 is a flow chart illustrating an example method 300. In this example, method 300 begins at block 310, where a computing device associated with a vehicle can store a map. The vehicle can be configured to operate in a non-autonomous mode, a partially-autonomous mode, and an autonomous-operation mode. The map can include information about a plurality of roads and a plurality of features. In some embodiments, the plurality of features can include a lane-center-location feature. In particular of these embodiments, the lane-center-location feature is based on one or more lane-edge features.

In other embodiments, the plurality of features can include a speed-limit feature. The speed-limit feature can specify a maximum speed for at least part of the route. In particular of these embodiments, the speed-limit feature can specify a minimum speed for the at least part of the route.

In still other embodiments, the plurality of features can include a feature related to allowing or inhibiting changes in direction, such as, but not limited to, a feature related to a one-way street, a feature related to a two-way street, a feature related to allowing or inhibiting U-turns, and/or a feature regulating turns. In even other embodiments, the map includes imagery of at least part of the route.

At block 320, the vehicle can be operated in the partially-autonomous mode. Operating in the partially-autonomous mode can include: (i) generating driving directions for manual execution along a route based on the map, (ii) receiving information related to features of the route and to a quality of driving along the route, the plurality of features including at least some of the features of the route, and (iii) storing the information related to the features of the route and to the quality of driving along the route.

In some embodiments, the stored information related to the features of the route and the quality of driving along the route can include an annotation about the quality of driving along the route. In particular of these embodiments, the annotation can include an indication that a lane marker was violated. In other of these embodiments, the annotation can include an indication that a traffic control signal was ignored.

In even other of these embodiments, one traversal of the route can be N miles long, N>0. During one traversal of the route, A annotations can be added to the stored information related to the route and the information related to the quality of driving, where A≧0. The one or more quality control statistics can include a quality control statistic based on A/N.

At block 330, the map can be updated based on the stored information related to the features of the route and to the quality of driving along the route. At block 340, one or more quality control statistics can be determined, based on the stored information related to the features of the route and to the quality of driving along the route.

At block 350, a determination can be made whether to publish the updated map based on the one or more quality control statistics. In some embodiments, determining whether to publish the updated map based on the one or more quality control statistics can include operating the vehicle in the autonomous-operation mode. Operating the vehicle in the autonomous-operation mode can include: generating driving directions for automatic execution based on the map and receiving safety-driver feedback on the automatic execution from a trained safety driver in the vehicle. A determination can be made whether to publish the updated map based on the one or more quality control statistics and the safety-driver feedback.

At block 360, in response to determining to publish the updated map, the published map can be stored in the computing device, and the vehicle can be enabled to operate in the autonomous-operation mode. While in the autonomous-operation mode, the vehicle can be enabled to operate using the published map. For example, the computing device can be configured to generate and execute driving directions for the vehicle based on the published map. In some embodiments, the computing device can execute the driving directions for the vehicle while in the autonomous-operation mode.

FIG. 4A shows an example candidate map 400. Candidate map 400 can include imagery 402 and one or more lane level maps. Imagery 402 can be taken from an overhead view, e.g., satellite views, a street-level view, and/or combinations of overhead view(s) and street-level view(s). Lane level maps can include indications of features of import in the environment usable while driving a vehicle such as roads, intersections, lane-boundary markings, lane-center markings, traffic control signals, traffic control signs, road direction information (e.g., road is one-way northbound, two-way east/westbound), intersections, objects occluding traffic control signals and signs, and other features related to the map.

Figure 4:
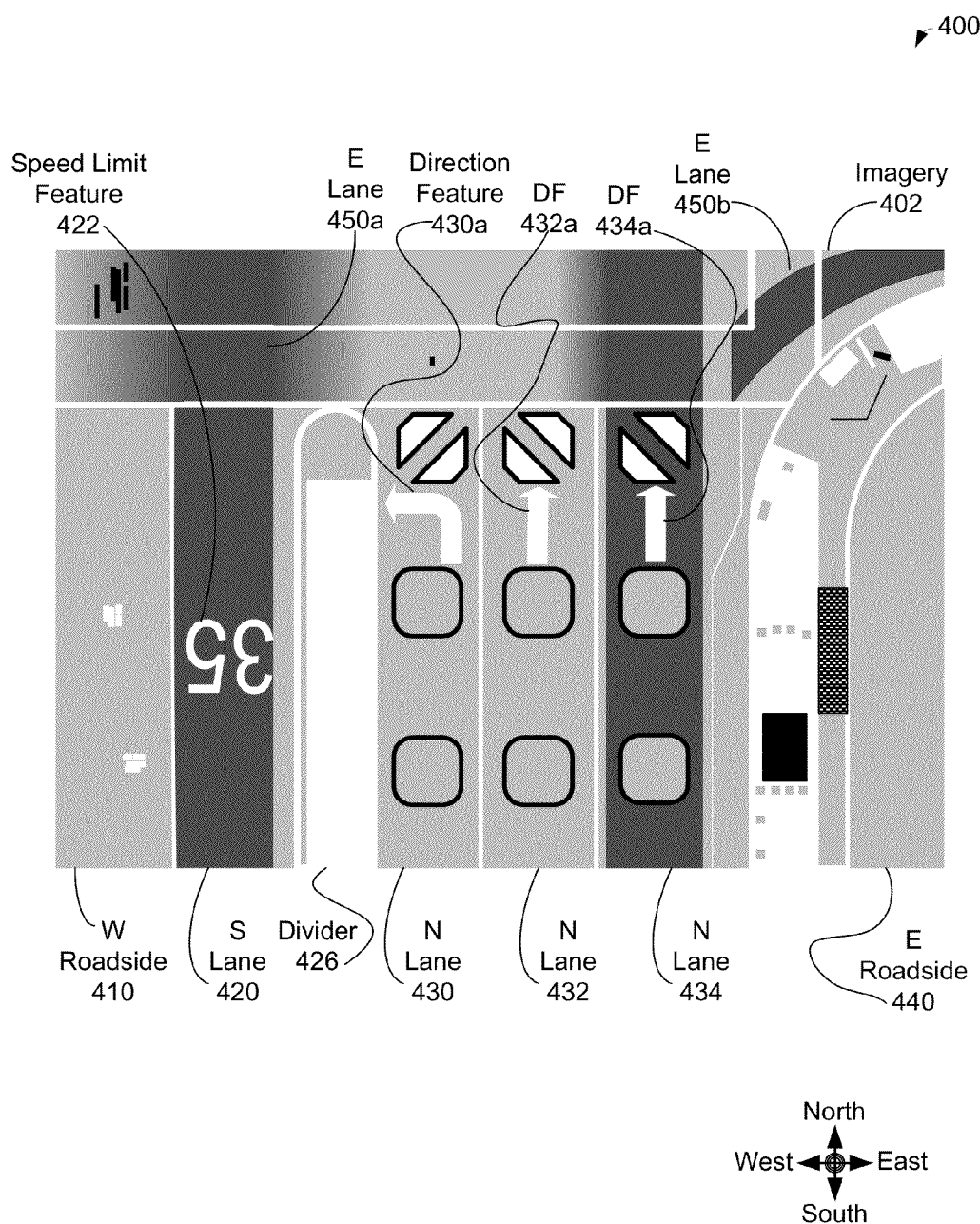
FIG. 4 shows an example candidate map of an intersection, in accordance with an example embodiment.

FIG. 4 shows candidate map 400 with imagery 402 of an intersection with a west roadside 410, a southbound lane 420, lane divider 426, northbound lanes 430, 432, 434, east roadside 440, and eastbound lane 450a, 450b. Southbound lane 420, as shown in FIG. 4, includes a speed limit feature 422 indicating a speed of 35 in southbound lane 420. The speed of 35 indicated by speed limit feature can be a minimum speed or a maximum speed. In some scenarios, the speed limit feature can include both a minimum speed and a maximum speed; e.g., a speed limit feature for at least a portion of a route with a minimum speed of 40 miles per hour and a maximum speed of 55 miles per hour.

Northbound lane 430 includes direction feature 430a indicating that northbound lane 430 is to be used for making a left turn. Additionally, FIG. 4 shows that northbound lanes 432, 434 respectively include direction features (DFs) 432a, 434a indicating that traffic is directed straight through the intersection. Eastbound lane 450a is shown in FIG. 4 turning north 450b toward the upper-right hand of candidate map 400.

Candidate map 400 can be used for simulated cruising, where the vehicle operates in a partially-autonomous mode with a human driver. During a simulated cruise, a vehicle control system is configured to generate driving instructions along a route of the candidate map and the human driver drives the vehicle by trying to follow the generated driving instructions. If a generated driving instruction is correct and safe, the human can carry out the generated driving instruction. However, if the generated driving instruction is faulty, the human driver can annotate the faulty driving instruction and adjust the instruction for driving safety and/or to reach a destination of the route. Example annotations include, but are not limited to, annotations for violations of lane markers and/or speed limits, ignored traffic signals or signs, abrupt/uncomfortable turns, and incorrect directions along the route.

During each simulated cruise, the vehicle control system can log information about the route and vehicle operation, such as time, position, speed, and acceleration information. In some embodiments, the logged information can include the driving instructions and/or annotations.

Table 1 below shows an example log from a simulated cruise.

TABLE 1

| Time | Location, Velocity, and Acceleration | Event/Driving Instruction | Annotation |
|---|---|---|---|
| Jun. 1, 2012 17:00 | L: Main and Oak V: 35 MPH North A: 0. | Drive North along Main St. | |
| Jun. 1, 2012 17:01 | L: near Main and Elm V: 37 MPH North A: 0 | Current Speed is 35 MPH, Speed limit is 30 MPH. Slow to 30 MPH. | A little fast for instruction, since we just passed 30 MPH sign. |
| Jun. 1, 2012 17:01 | L: Main and Elm V: 28 MPH North A: −2 ft./sec$^2$ | Take Left onto Elm | |
| Jun. 1, 2012 17:02 | L: Elm V: 33 MPH West A: 2.1 ft./sec$^2$ | Proceed along Elm for 2.2 miles until reaching Amphitheatre | |
| Jun. 1, 2012 17:04 | L: Elm V: 28 MPH West A: 0 ft./sec$^2$ | Change to right lane in preparation for turn. | For this route, I think it's a left turn from Elm onto Amphitheatre. Also, an immediate lane change would have been fatal since truck was in right lane. |
| Jun. 1, 2012 17:05 | L: Elm V: 29 MPH West A: −2.1 ft./sec$^2$ | Change to left lane in preparation for turn. | See previous annotation. |
| Jun. 1, 2012 17:05 | L: Elm and Amphitheatre V: 22 MPH Southwest A: −3.3 ft./sec$^2$ | Make left turn onto Amphitheatre | |
| Jun. 1, 2012 17:06 | L: Amphitheatre V: 33 MPH South A: 2.5 ft./sec$^2$ | Change to left lane | Amphitheatre is only a two-lane road. Cannot change lanes! |

While the log above shows use of street addresses for locations, and English units for velocity and acceleration, other notation systems, such as coordinates for latitude and longitude, and/or units can be used instead or as well. After one or more simulated cruises, the logged information can be used to update the candidate map. Simulated cruises can be undertaken along the route using the updated candidate map until the generated driving instructions lead to a safe drive on the route. In some cases, simulated cruises can cover each lane of each road along the route.

After simulating cruising, the updated candidate map can be tested while the vehicle is in autonomous-operation mode. Once simulated cruising is successful, the updated candidate map can be tested during test drive(s) in fully autonomous vehicle operation utilizing the vehicle control system accompanied by trained human safety drivers.

QC statistics generated during the test drive can indicate that the vehicle is operating properly or not operating properly while in the autonomous-operation mode. As with the simulated cruises, the vehicle control system can log information about the route and vehicle operation during autonomous vehicle operation. Also, during the drive, the safety driver can add annotations, such as the annotations shown in Table 1 above, to the log about the accuracy, comfort, and safety of the drive. The logs from autonomous vehicle operation can then be analyzed by the automated QC system.

For example, one traversal of the drive can be N miles long, N>0. During the drive, A annotations can be logged, where A≧0. The one or more quality control statistics can include a quality control statistic based on A/N; a.k.a. a statistic based on a number of annotations per unit distance, such as annotations per mile or annotations per kilometer. In some embodiments, a quality control statistic can be based on a number of errors per unit distance. The errors can include annotations and/or faults in the map detected by the autonomous vehicle during the drive and stored in logs about the drive.

For each lane segment, QC statistics can be gathered for whether the autonomous drive was successful and then stored in a back-end database. For example, if a number of annotations per unit distance driven is less than a threshold value, the autonomous drive can be considered to be successful. The back-end database can store QC statistics, safety-driver feedback, candidate maps, promoted/published maps, visibility information, and/or other data. In some embodiments, autonomous vehicles can obtain information stored in the back-end database, perhaps while in operation, using wireless and/or other communications interfaces. For example, autonomous vehicles can obtain new and/or modified promoted/published maps from the back-end database. As another example, if an autonomous vehicle is traveling to an unfamiliar area, the autonomous vehicle can obtain mapping and perhaps other information related to the unfamiliar area from the back-end database.

After each subsequent autonomous vehicle test drive, the candidate map can be further updated based on the logged information gathered during test drives. Once all lanes of routes of the candidate map have gathered enough successful QC statistics, the candidate map can be promoted for use in autonomous vehicles operating without human drivers. In some embodiments, the logged information, QC statistics, candidate and/or promoted maps can be provided to the back-end database, perhaps for publication to other vehicles and/or databases.

If the map is modified e.g., due to changes in imagery and/or lane level information, the QC statistics for the modified segment(s) of the map can be reset to indicate the modified segment(s) are not promoted. Then, the QC process discussed above can be repeated to review, update, and promote the modified segment(s). In some cases, the map stores timing statistics related to the last successful operation along each segment of the map. For example, suppose the last successful operation for a segment S of the map was at time T(S) and the current time is Now. If Now−T(S) is greater than a threshold period of time; e.g. a month, then the QC statistics for segment S can be reset so that only recently successfully driven segments, e.g., segments driven within the threshold period of time, remain in the promoted/published map. In some embodiments, some or all modified segments of maps can be provided to the back-end database.

In some embodiments, an autonomous vehicle utilizing a promoted or published map can be configured to provide information about the route, such as successful traversal of a route, imagery captured while traversing the route, information on route changes, and/or annotations/comments from human passengers traveling along the route. In particular embodiments, human passengers can decide whether some or all of the information is provided. For example, if the vehicle appears to ignore a recent change to a route, such as a start or completion of construction, a human passenger can annotate the promoted/published map to indicate that the map needs to include the recent change. Information provided by autonomous cars traveling along routes outside of the QC process can be used to refresh the QC statistics about the promoted or published map and/or indicate that portion(s) of the map can be considered for retesting.

Figure 5A:
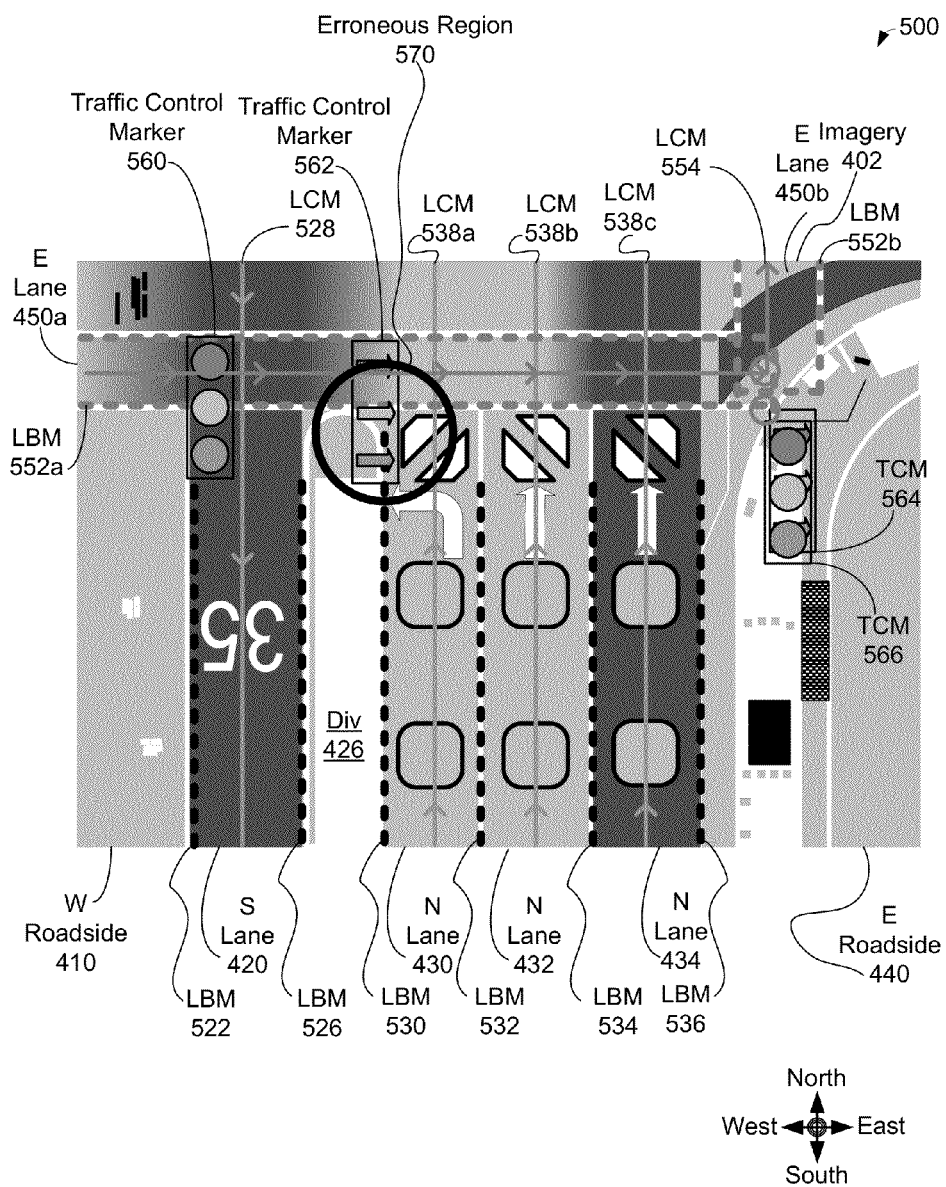
FIG. 5A shows a candidate map with imagery of the intersection shown in FIG. 4 overlaid with lane-level map information, in accordance with an example embodiment.

FIG. 5A shows candidate map 500 with imagery 402 as shown in FIG. 4 overlaid with lane-level map information. The lane-level map information can include lane boundary markers (LBMs) and/or lane center markers (LCMs). FIG. 5A shows southbound lane 420 with lane center marker 528 and delineated by lane boundary markers 522, 526. Northbound lanes 430, 432, 434 are shown in FIG. 5A with respective lane center markers 538a, 538b, 538c and delineated by lane boundary markers 530, 532, 534, and 536. FIG. 5A shows eastbound lane 450a with lane center marker 554 and delineated by lane boundary marker 552a, and lane 450b with lane center marker 554 and delineated by lane boundary marker 552b.

FIG. 5A also indicates position of traffic control devices using traffic control markers 560, 562, 564, and 566. An error in candidate map 500 is shown in erroneous region 570 where lane boundary marker 530 runs directly into traffic control marker 562. This error could lead to an accident; e.g., an autonomous vehicle colliding with traffic control marker 562.

The error in erroneous region 570 can be detected by observations during a simulated cruise and/or during operation of the autonomous vehicle with an accompanying safety driver. In other scenarios, the error in erroneous region 570 can be detected by visual observation of candidate map 500 before candidate map 500 is loaded into an autonomous vehicle.

Figure 5B:
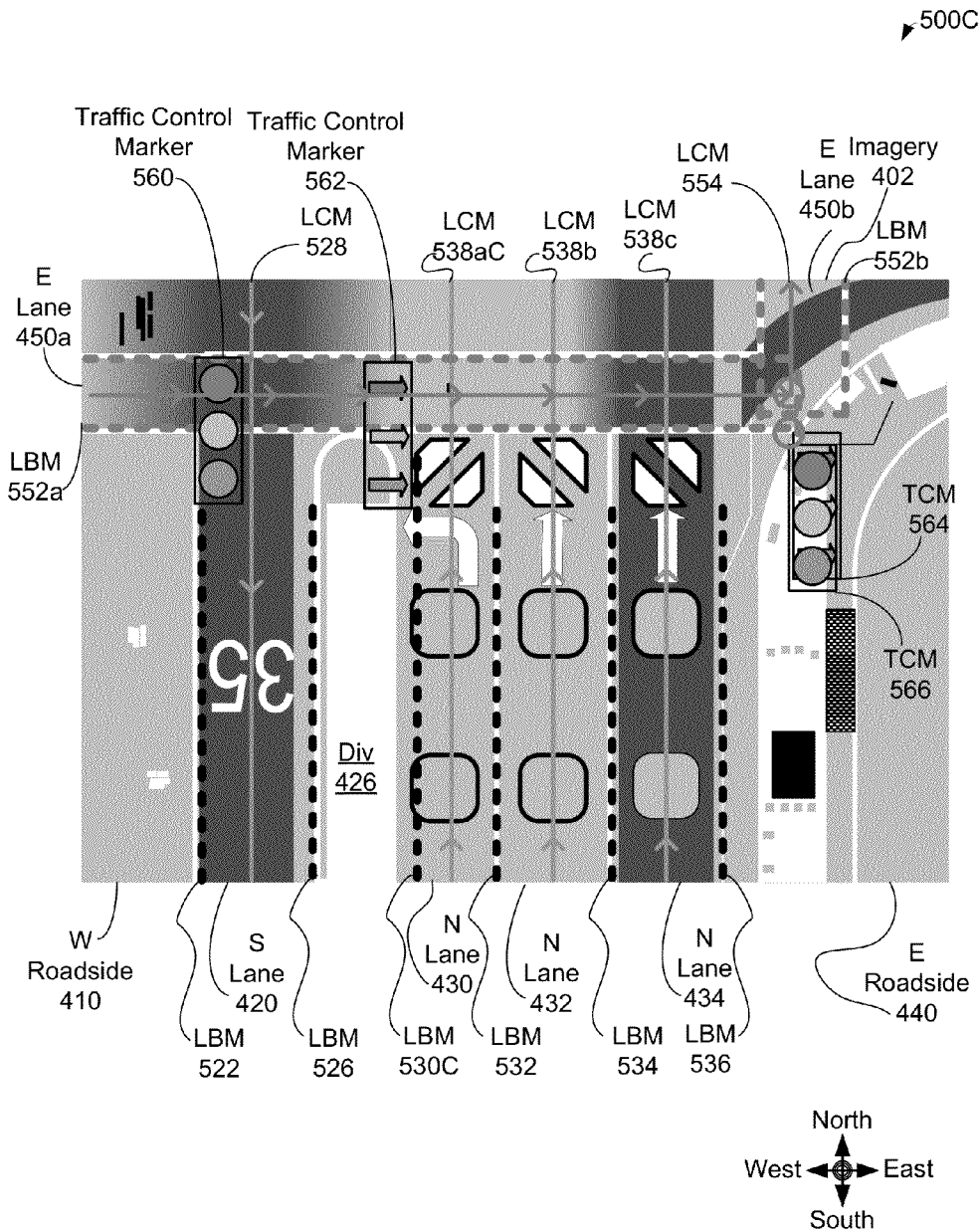
FIG. 5B shows a corrected version of the candidate map shown in FIG. 5A, in accordance with an example embodiment.

Once detected, the error in erroneous region 570 can be corrected. The resulting corrected candidate map 500C is shown in FIG. 5B. FIG. 5B shows that candidate map 500C is the same as candidate map 500 shown in FIG. 5B with lane boundary marker 530C moved to the east of traffic control marker 562. As lane boundary marker 530C has moved eastward, the center of lane 430 as delineated by lane boundary markers 530C and 532 has moved eastward. FIG. 5B shows that lane center marker 538aC has been moved eastward in accord with the eastward movement of corrected lane boundary marker 530C.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   storing a map at a computing device associated with a vehicle, wherein the vehicle is configured to operate in a non-autonomous mode, a partially-autonomous mode, and an autonomous-operation mode, and wherein the map comprises information about a plurality of roads and a plurality of features;
   operating the vehicle in the partially-autonomous mode, wherein operating the vehicle in the partially-autonomous mode comprises: (i) generating driving directions for manual execution along a route based on the map, (ii) receiving information related to features of the route and to a quality of driving along the route, the plurality of features including at least some of the features of the route, and (iii) storing the information related to the features of the route and to the quality of driving along the route;
   updating the map based on the stored information related to the features of the route and to the quality of driving along the route;
   determining one or more quality control statistics based on the stored information related to the features of the route and to the quality of driving along the route;
   determining whether to publish the updated map based on the one or more quality control statistics; and in response to determining to publish the updated map:
    storing the published map in the computing device, and enabling operation of the vehicle in the autonomous-operation mode using the published map.

2. The method of claim 1, wherein enabling operation of the vehicle in the autonomous-operation mode using the published map comprises enabling operation of the vehicle without a human driver.

3. The method of claim 1, wherein determining whether to publish the updated map based on the one or more quality control statistics comprises:
    operating the vehicle in the autonomous-operation mode, wherein operating the vehicle in the autonomous-operation mode comprises:
        generating driving directions for automatic execution based on the map and
        receiving safety-driver feedback on the automatic execution from a trained safety driver in the vehicle; and
    determining whether to publish the updated map based on the one or more quality control statistics and the safety-driver feedback.

4. The method of claim 1, wherein the plurality of features comprise a lane-center-location feature.

5. The method of claim 1, wherein the plurality of features comprise a speed-limit feature, and wherein the speed-limit feature specifies a maximum speed for at least part of the route.

6. The method of claim 4, wherein the speed-limit feature further specifies a minimum speed for the at least part of the route.

7. The method of claim 1, wherein the plurality of features comprises a feature related to allowing or inhibiting changes in direction.

8. The method of claim 1, wherein the map comprises imagery of at least part of the route.

9. The method of claim 1, wherein the stored information related to the features of the route and the quality of driving along the route comprises an annotation about the quality of driving along the route.

10. The method of claim 9, wherein the annotation comprises an indication that a lane marker was violated.

11. The method of claim 9, wherein the annotation comprises an indication that a traffic control signal was ignored.

12. The method of claim 9, wherein one traversal of the route is N miles long with N>0, wherein during one traversal of the route A annotations are added to the stored information related to features of the route and related to the quality of driving along the route with $A \geq 0$, and wherein the one or more quality control statistics comprise a quality control statistic based on A/N.

13. An article of manufacture including a non-transitory computer-readable storage medium having instructions stored thereon that, when executed by a processor, cause the processor to perform functions comprising:
    storing a map at a computing device associated with a vehicle, wherein the vehicle is configured to operate in a non-autonomous mode, a partially-autonomous mode, and an autonomous-operation mode, and wherein the map comprises information about a plurality of roads and a plurality of features;
    operating the vehicle in the partially-autonomous mode, wherein operating the vehicle in the partially-autonomous mode comprises: (i) generating driving directions for manual execution along a route based on the map, (ii) receiving information related to features of the route and to a quality of driving along the route, the plurality of features including at least some of the features of the route, and (iii) storing the information related to the features of the route and to the quality of driving along the route;
    updating the map based on the stored information related to the features of the route and to the quality of driving along the route;
    determining one or more quality control statistics based on the stored information related to the features of the route and to the quality of driving along the route;
    determining whether to publish the updated map based on the one or more quality control statistics; and
    in response to determining to publish the updated map:
        storing the published map in the computing device, and enabling operation of the vehicle in the autonomous-operation mode using the published map.

14. The article of manufacture of claim 13, wherein enabling operation of the vehicle in the autonomous-operation mode using the published map comprises enabling operation of the vehicle without a human driver.

15. The article of manufacture of claim 13, wherein the plurality of features comprise a lane-center-location feature, and wherein the lane-center-location feature is based on one or more lane-edge features.

16. The article of manufacture of claim 13, wherein the plurality of features comprise a speed-limit feature, and wherein the speed-limit feature specifies a maximum speed for at least part of the route.

17. The article of manufacture of claim 13, wherein the plurality of features comprises one or more images of the route.

18. The article of manufacture of claim 13, wherein the stored information comprises an annotation about the quality of driving along the route, and wherein the annotation comprises an indication that a lane marker was violated and/or comprises an indication that a traffic control signal was ignored.

19. The article of manufacture of claim 13, wherein one traversal of the route is N miles long with N>0, wherein during one traversal of the route A annotations are added to the stored information related to features of the route and related to the quality of driving along the route with $A \geq 0$, and wherein the one or more quality control statistics comprise a quality control statistic based on A/N.

20. A computing device, comprising:
    a processor; and
    a non-transitory computer-readable storage medium, configured to store instructions that, when executed by the processor, cause the computing device to perform functions, comprising:
        select a map for a vehicle, wherein the vehicle is configured to operate in a non-autonomous mode, a partially-autonomous mode, and an autonomous-operation mode, and wherein the map comprises information about a plurality of roads and a plurality of features,
        operating the vehicle in the partially-autonomous mode, wherein operating the vehicle in the partially-autonomous mode comprises: (i) generating driving directions for manual execution along a route based on the map, (ii) receiving information related to features of the route and to a quality of driving along the route, the plurality of features including at least some of the features of the route, and (iii) storing the information related to the features of the route and to the quality of driving along the route;

updating the map based on the stored information related to the features of the route and to the quality of driving along the route, determining one or more quality control statistics based on the stored information related to the features of the route and to the quality of driving along the route, determining whether to publish the updated map based on the one or more quality control statistics, and in response to determining to publish the updated map:
  storing the published map in the computing device, and
  enabling operation of the vehicle in the autonomous-operation mode using the published map.

21. The computing device of claim 20, wherein the map comprises imagery of at least part of the route.

* * * * *